Dec. 15, 1953
A. G. BODINE, JR
2,662,513
ACOUSTIC MEANS AND METHOD FOR SUPPRESSING
DETONATION IN INTERNAL-COMBUSTION ENGINES
Filed May 12, 1950
2 Sheets-Sheet 1
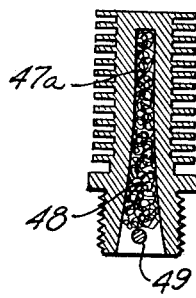
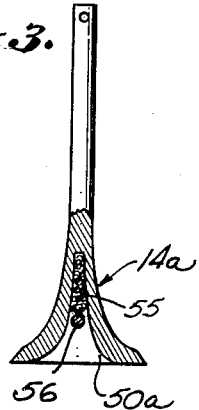
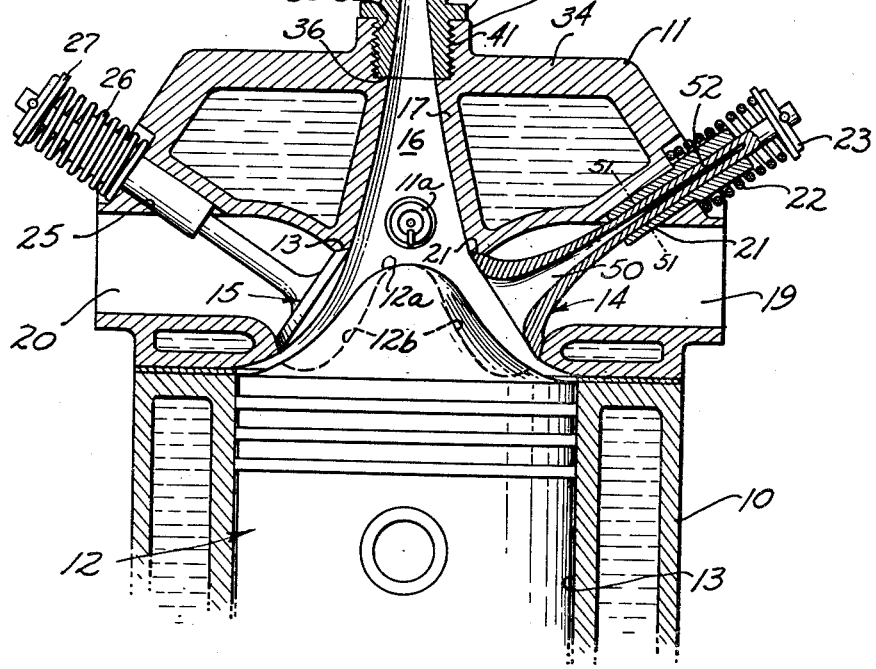
ALBERT G. BODINE JR
INVENTOR.
BY
ATTORNEY.

Dec. 15, 1953    A. G. BODINE, JR    2,662,513
ACOUSTIC MEANS AND METHOD FOR SUPPRESSING
DETONATION IN INTERNAL-COMBUSTION ENGINES
Filed May 12, 1950    2 Sheets-Sheet 2
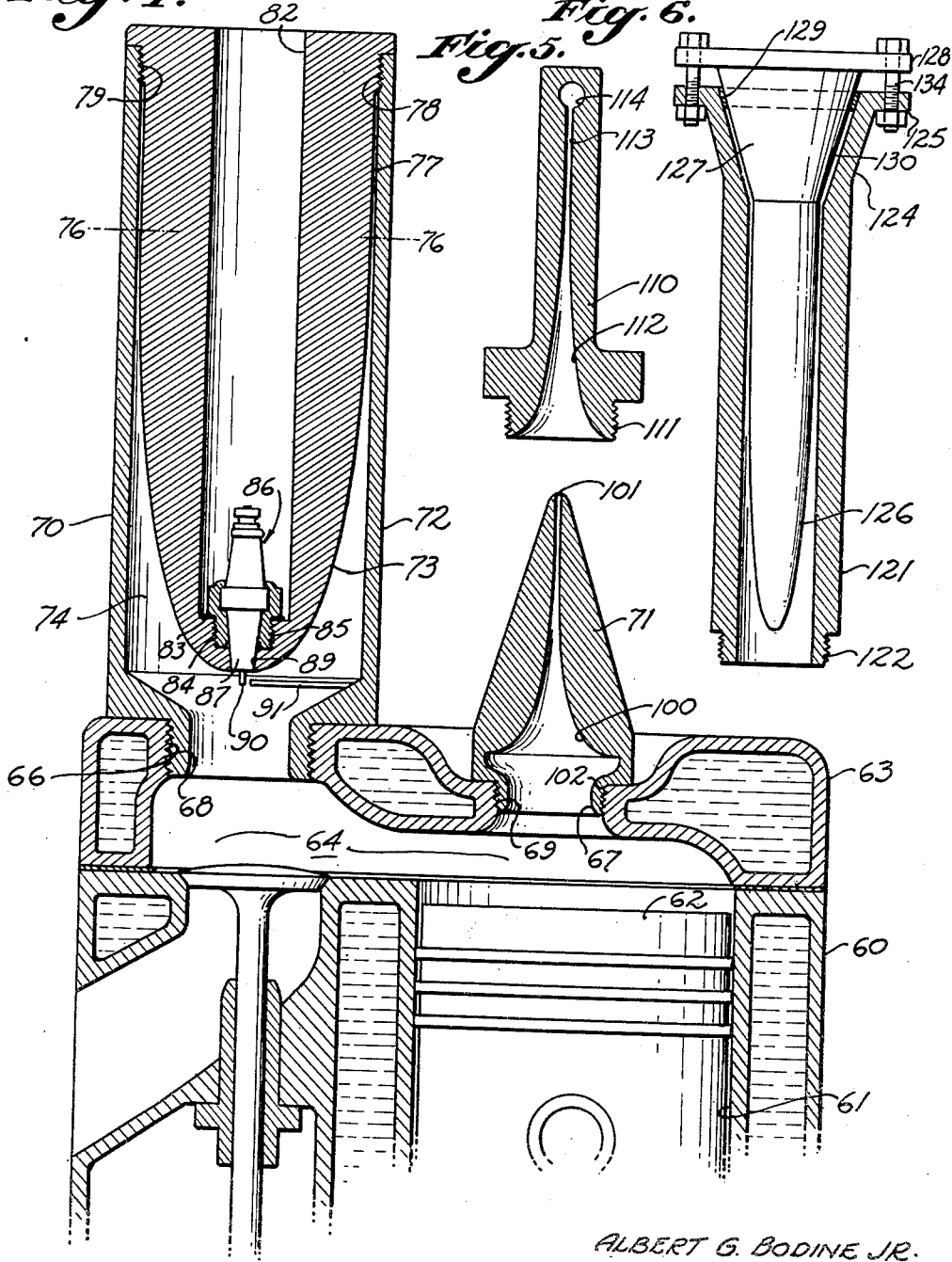
ALBERT G. BODINE JR.
INVENTOR.
BY Forrest J. Lilly
ATTORNEY.

Patented Dec. 15, 1953

2,662,513

UNITED STATES PATENT OFFICE 2,662,513

ACOUSTIC MEANS AND METHOD FOR SUPPRESSING DETONATION IN INTERNAL-COMBUSTION ENGINES

Albert G. Bodine, Jr., Van Nuys, Calif.

Application May 12, 1950, Serial No. 161,695

5 Claims. (Cl. 123—191)

This invention relates in general to internal combustion engines and more particularly to methods of and means for suppressing irregular burning and detonation of fuel-air mixture therein.

In the operation of internal combustion engines of the piston and cylinder type, it sometimes happens, as a result of improper spark advance, inferior fuels, improper design or operation, or other reasons, that irregularities of combustion occur during the combustion cycle so that operation of the engine is noisy and its various parts are subjected to sudden violent shocks, and, in some cases, to stresses above those for which they were designed. The term "detonation" has been applied to a variety of such irregularities in the operation of internal combustion engines all of which may not result from exactly the same causes or manifest themselves in exactly the same way. While the causes and manner of occurrence of detonation are still subject to research which may reveal new and unexpected aspects, most investigators agree that detonation occurs when normal combustion, at its relatively slowly traveling flame front, somehow causes the pressure and temperature of the last part of the charge to reach its kindling point causing the whole remaining portion to go off spontaneously; that is, it "detonates." The sudden rise in pressure and temperature resulting from this detonation of the last portion of the charge is a shock phenomena which sets up violent compression waves throughout the combustion chamber. I have found that the frequency of these waves in a chamber of given shape and dimensions may be calculated on the same basis as sound waves, taking into account, of course, the pressure and the temperature of the gases involved and the resonant frequencies of mechanical structures such as pistons, connecting rods, etc., in pressure communication with the combustion chamber gases. As a matter of fact, they involve or include high energy sound waves, consisting of alternate waves of condensation and rarefaction following one another by 180°. It has also been observed that while ordinary normal combustion proceeds with a more or less gradual increase in pressure to a pressure peak, and a gradual decline therefrom, during which any sound waves are of incidental magnitude, when detonation occurs, pressure builds up with great rapidity to a pressure peak substantially in excess of that normally encountered and a number of these pressure peaks may occur during the power stroke. Such investigation as has been carried on shows that detonation is often initiated by a shock wave in the nature of a sudden high pressure peak, and that this first pressure peak is followed by a secondary phase consisting of a sonic frequency wave pattern made up of succeeding pressure peaks of first increasing and then diminishing magnitude. My investigations have shown that this phenomenon, including the initial pressure peak or shock phase which introduces the detonation, is of an acoustic nature, or has essential acoustic phases. The wave form of the initial pressure peak, when analyzed, shows the presence of a high frequency component; and the subsequent wave pattern, of rising and then decaying amplitude, quite apparently, I find, occurs at a resonance frequency of the combustion chamber, considering the latter as a resonant acoustic chamber. Also, I believe, the increasing and then decreasing amplitude phases of the detonation wave pattern may be fully explained on the basis of a phenomena known in acoustics as the "singing flame." The first detonation pressure shock compresses the fuel charge sufficiently that the rate of combustion suddenly increases; this increases the amplitude of the pressure peak, which in turn is transmitted with the speed of sound to be reflected back from the combustion chamber walls to increase the combustion rate on a subsequent wave cycle, and so on. The increment of added pressure rise on each half-cycle of the pressure wave is limited by the time interval involved, but succeeding pressure wave peaks are of higher and higher amplitude until a maximum is reached, the limit possibly being imposed by exhaustion of the fuel charge. In other words, each cycle of the sound wave causes the flame to give out a pressure pulse, and each pressure pulse adds acoustic energy to the wave pattern, which cooperative performance continues to a maximum. The wave pattern then gradually decreases or decays from this maximum. This phase of substantially continuously augmented wave maintenance, even if only for a few cycles, is very destructive to engines. Also, in cases where the initial shock is of large magnitude, the characteristic high frequency acoustic portion thereof is very serious.

Operation under detonation conditions not only results in unsatisfactory engine performance but also in damage to the engine such as enlargement of the bearings, buckling of crank pins, cracking of pistons, buckling of rods, or cracking of the block or cylinder head. Since serious detonation results if the engine is designed with too high a compression ratio, one way of avoiding detonation is to design the engine with a compression ratio substantially below the danger point. However, it is desirable to use the highest compression ratio possible in order to achieve maximum performance, and most engines, therefore, especially aircraft engines, are designed to operate at a compression ratio which is so high that they are always on the verge of detonating. It is accordingly important that some method and means be found for suppressing detonation, in order to prevent damage to the engine by detonation, and also so as to permit use of higher compression ratios without encountering detonation, thus making possible the design of an engine with superior performance.

It is accordingly the primary object of the present invention to provide an improved method and means for suppressing detonation in internal combustion engines, taking into account the acoustic origin and nature of certain detonation phenomena.

As stated in the foregoing, I have found that the phenomena known as detonation involves or includes the creation of high amplitude sound waves occurring at a resonant frequency of the combustion chamber. These sound waves have one or more points of origin within the combustion chamber, and they travel to and are reflected or "echoed" by the relatively rigid chamber walls, the travelling and reflected waves probably interfering to reinforce one another and so promote the high amplitude resonant wave pattern. Standing waves with attendant pressure and velocity anti-nodal regions are now known to be present in at least some of the cases, if not always, but their existence is apparently unnecessary to the invention. The extreme stresses set up in certain members of the engine as a result of detonation is perhaps evidence of the existence of one or more pressure anti-nodes, but the impact of the violent waves of compression and rarefaction on the reflection surfaces of the engine is enough to account for the phenomena. A substantial degree of reflection of the travelling acoustic waves from the walls of the combustion chamber is, however, essential to both the initial creation and the subsequent maintenance of the high amplitude acoustic wave pattern which is inherent in detonation. Accordingly, the present invention is based on the concept of attenuating the detonation wave pattern by curtailing acoustic wave reflections within the chamber.

The invention may also be broadly regarded as based on the concept of inhibiting or suppressing the resonant characteristics of the combustion chamber, considered as an acoustic chamber, thus removing or substantially reducing a factor essential to maintenance of high amplitude acoustic detonation waves. The invention accordingly contemplates the suppressing of acoustic wave reflection and resonance within the combustion chamber as a means for preventing or stifling the high amplitude pressure wave phenomena of detonation.

Broadly speaking, the present invention provides, in one of its aspects, a combustion chamber which is essentially an anechoic acoustic chamber. By anechoic I do not infer the 100% elimination of echoes or reflections, but the very material and substantial reduction thereof, to such an extent that detonation conditions springing from resonance or sound wave reflections inside the chamber are very materially ameliorated. From evidence now in the possession of the art, normal combustion may involve certain low amplitude wave patterns, and it is not my purpose to eliminate these, since they are not harmful, and further research may even show them to be beneficial. The "anechoic" combustion chamber of the present invention thus is not designed to be an absolute "dead chamber," but only to have such sound wave attenuation characteristics as to assure suppression of the high amplitude detonation pattern to a harmless value. It is to be understood that the term "anechoic" is used with this meaning throughout the specification and claims.

Those versed in the acoustic art are aware of various ways in which an acoustic chamber can be treated to make it essentially anechoic. As a principal illustrative form of the invention, I have chosen to illustrate herein an anechoic combustion chamber created by giving a configuration to the combustion chamber walls which results in attenuation of detonation frequency acoustic wave phenomena within the chamber. In a preferred illustrative form of the invention, the top wall of the chamber, above the piston, is in the form of an exponential horn, preferably with a narrow passageway at its throat providing an attenuative termination. Such a formation will effectively absorb or attenuate detonation sound waves generated within the chamber, and will provide an essentially anechoic chamber.

It is also within the scope of the present invention to modify existing or conventional combustion chambers by incorporating certain specific acoustic attenuative configurations of exponential type into the shapes of the chambers, or by attaching to the chambers auxiliary devices having attenuative configurations of the exponential type.

The invention will be more fully understood from the following detailed description of certain present illustrative embodiments thereof, reference for this purpose being had to the accompanying drawings, in which:

Figure 1 is a vertical sectional view of an internal combustion engine taken medially through the combustion chamber and showing an application of the present invention;

Figure 2 is a vertical longitudinal section showing a modification of a portion of Figure 1;

Figure 3 is a vertical longitudinal section showing a modification of a portion of Figure 1;

Figure 4 is a vertical sectional view of a modified internal combustion engine taken medially through the combustion chamber and showing modified applications of the present invention;

Figure 5 is a view in longitudinal medial section showing a modification of a portion of Figure 4; and Figure 6 is a view in longitudinal medial section showing another modification of Figure 4.

With reference first to Figure 1, numeral 10 designates the upper portion of a water cooled block of an internal combustion engine, said block having a water cooled head 11 fastened thereto, a piston 12 reciprocable in cylinder 13 within the block, a spark plug 11a mounted in head 11, and intake and exhaust valves 14 and 15, respectively. A combustion chamber 16 is provided over cylinder 13 and is in the approximate form of an exponential horn whose mouth or bell joins head 10 at the margin of cylinder 13. The lower portion of the horn-shaped combustion chamber is defined by an inside horn-shaped head wall 17, and the upper portion thereof by a suitable wall contained within a presently described chamber extension 18. The intake and exhaust valves control fuel intake and exhaust passages 19 and 20 opening through wall 17 into chamber 16.

The stem of valve 14 is reciprocable in valve guide 21 mounted in head 11 and is spring actuated to closed position by spring 22 acting against washer 23 on the end of the valve stem. The stem of exhaust valve 15 is similarly provided with a valve guide 25 mounted in head 11, and is spring actuated to closed position by means of spring 26 acting against washer 27 mounted on the extremity of the valve stem. The valves 14 and 15 may be operated in timed sequence with respect to the stroke of piston 12 by any suitable valve actuating mechanism operating on the respective valve stems, as will be understood by those skilled in the engine art without the necessity of further illustration herein. The inner wall 17 of the combustion chamber extends upwardly from a juncture with cylinder 13 in the form of a horn to the level of the top wall 34 of head 11. The wall 34 has an upwardly extending tubular boss 35, internally bored and screw threaded, as at 35a, to a shoulder 36, and the previously mentioned combustion chamber extension 18 has a hollow externally screw threaded stem 41, which is screwed into bore 35a until its flange 42 engages the outer end of boss 35. This extension 18 contains a chamber or passageway 44 whose defining walls form an exponential horn continuation of the interior surface of wall 17. The chamber 16 thus consists of the space surrounded by wall 17, together with the space or chamber 44 enclosed within the combustion chamber extension 18. This combustion chamber 16, as already mentioned, is essentially in the form of an exponential horn, the mouth of which is coextensive with cylinder 13, and the throat of which is contained within the extension 16. The side walls of the horn are made substantially exponential from the mouth to a plane 46 where the throat has been reduced to a relatively small diameter, for example, about a millimeter, and above plane 46, the throat communicates with a sound wave attenuator element which in this instance consists of a straight uniform diameter bore 47 of an inch or so in length, and of a small diameter, typically a millimeter. The extension 18 may be air cooled, and in the present illustrative embodiment it is made generally cylindrical in form, and provided with cooling fins 48. However, in some cases it may be found desirable to permit the extension 18 to run relatively hot so as to burn out carbon deposits and keep the passageway 47 clean. For such cases the cooling fins would be omitted.

The top of piston 12 is shown to have a hump 12a, formed to be receivable inside the mouth of the horn, and it will be understood that this formation is merely to reduce the clearance volume of the combustion chamber. This hump 12a is shown indicated as formed with pockets 12b adapted to receive the intake and exhaust valves, so as to avoid interference between said parts in the operation of the engine.

When considering the type of anechoic chamber which uses any of the known types of acoustic couplers, such as an exponential horn, it is important to recognize that certain acoustic laws must be followed to a substantial degree in order to prevent the undesirable wave reflections. The exponential horn picks up the wave from the combustion chamber and directs it down the contracting horn shaped "wave guide," and thereby greatly increases the acoustic energy density of the wave. The increased energy density very greatly increases the attenuating ability of the various types of attenuators which may be used at the termination of the horn. These attenuators per se will be more fully referred to hereinafter. The horn actually functions as a coupler to the attenuating device, and is somewhat equivalent to a transformer in an electric circuit. The problems of impedance matching are every bit as important, to prevent undesirable reflections.

As is well known, a true exponential shaped horn doubles its cross-sectional area for equal increments of length. Of course, in so far as the general exponential law goes, the equal increments of length are not fixed at any specific value. Thus, with relatively short increments of length for each doubling of area, the horn will be relatively short, and may be said to have a high expansion ratio; and for relatively long increments of length, the horn will be relatively long, and may be said to have relatively low expansion ratio. The ability of the exponential horn to respond to waves of any given frequency range is intimately related to this expansion ratio, and it accordingly becomes desirable to design the exponential curve with account taken for the frequency or wave length of the detonation waves which are to be suppressed.

I have found the following equation to be a very good guide in designing exponential shapes for anechoic combustion chambers: $S = S_0 e^{bx}$ in which "$S$" is the cross-sectional area (square inches) at any station of distance "$x$" (inches) from the small end where the area is "$S_0$." The constant "$e$" is the well known base for natural logarithms. The constant "$b$" determines the longest wave length (in inches) which the horn will accept and transmit down its throat. Entering waves of longer wave length will be reflected back from the horn. I have found this longest wave length to be a function of each particular combustion chamber design; and in many cases a function of combustion chamber size.

A desirable value for the constant "$b$" for a five inch equivalent wave length (corresponding to the lowest characteristic detonation frequency I have found in a three inch bore engine combustion chamber) is 0.20. Increasing the wave length (reducing the frequency) requires a proportionate decrease in the exponential constant "$b$" in order to provide a more gradual taper (lower expansion ratio) so that the horn will accept the longer wave without reflection. A horn with an exponent of 0.20 will have virtually a cutoff, or no response, for a ten inch equivalent wave length. Thus, in general, the less the rate of taper (the smaller the value of the exponent "$b$"), the greater the wave length, and the lower the wave frequency, which can be suppressed by the horn and its attenuator.

In the operation of the present invention, the phenomena of detonation is largely stifled at its birth by absorbing and dissipating a large share of the acoustic wave energy of the first detonation shock. The first detonation pressure rise may be initiated by a simple explosion, but the inherent acoustic components of this pressure rise are attenuated and absorbed by the anechoic combustion chamber. Moreover, the initial shock wave, or that portion of it that survives the removal or reduction of its acoustic content, will then not be able effectively to initiate and/or maintain the usual ensuing sonic frequency detonation wave pattern, because of the lack of wave reflectivity and resonance in the anechoic chamber.

Considering specifically the anechoic combustion chamber of the engine of Figure 1, a detonation pressure wave initiated within the combustion chamber will travel up the exponential horn to the narrow throat portion thereof with ever increasing energy density, finally encountering the substantially non-reflecting wave attenuator consisting in this case of the narrow passageway 47. It is well known in acoustics that an enforced increase in the energy density of a sound wave, produced as by causing the wave to travel through a gradually constricted guide, creates a condition favorable for attenuation of the wave. In my combustion chamber, the energy density of any given detonation pressure wave travelling up the horn is very greatly increased by the time the wave passes the plane 46. The high energy density wave impulse then travels the length of the attenuator constituted by the fine passageway 47, wherein the pressure wave energy is dissipated by conversion into heat, and no reflected wave of any moment or importance travels back through the horn toward its mouth. The acoustic wave phenomena inherent in detonation are thus strongly inhibited.

Considering further the exponential horn type of combustion chamber illustrated in Figure 1, it will be recalled that the horn is exponential (approximately so) from its mouth to the plane 46, and beyond said plane, the throat of the exponential horn communicates with the straight small diameter wave attenuation bore 47. The energy density of the wave is very greatly increased by the time the plane 46 is reached, and the extremely high energy wave then forced to traverse the fine bore 47 is rapidly attenuated in so doing, with only small wave reflection back down the horn. It should also be appreciated that the pressure wave travelling up the exponential horn not only has its energy density greatly increased by the time it reaches the fine bore 47, but acquires a very steep wave front as it traverses bore 47. Conversion to this steep wave front is accompanied by creation of high frequency wave components, and such frequency changes within the attenuator result in still greater wave attenuation.

It is also to be noted that the exponential horn of Figure 1, which is shown as having its throat coupled to an attenuator consisting of a fine straight sided bore 47, might instead be continued past the plane 46 on an exponential curve, in which case the very fine portion of the throat beyond the plane 46 becomes the attenuator. Thus, the major length of the horn functions as a constricting wave guide to increase the energy density of the wave very greatly, and also as a coupling means between the point of origin of the detonation and an acoustic wave attenuator element in which the high energy wave is largely destroyed. The wave attenuator element might be any acoustic device capable of attenuating a high energy wave, as a fine straight tube or bore, the narrow or fine terminal portion of the throat of an exponential horn, or various other devices, some of which will be indicated hereinafter.

It may also be noted that whereas a combustion chamber configured as a true exponential horn of the character described is an ideal shape, considerable deviation from a true exponential curve is, in practice permissible without loss of the substantial benefits of the invention. Also, in those cases in which an exponential horn results in an overly-tall structure, the throat of the horn may be "folded," curled, or bent over, as is conventional in loud-speaker practice.

The poppet valve 14 is shown as desirably formed with an exponential horn shaped chamber 50, whose mouth opens through main combustion chamber 16, and whose throat extends upwardly through the stem of the valve along the longitudinal axis thereof, the throat of this exponential horn-shaped chamber, as in the case of the chamber 16, terminating at a plane 51 and connecting at this point with a fine uniformed diameter bore 52, of a typical diameter of a millimeter. This horn will also accept detonation sound waves, increasing their energy density, and attenuating their amplitude in the bore 52.

This horn shaped chamber 50 located in the valve 14 serves as a useful auxiliary in combination with the main combustion chamber horn 16; however, the use of an exponential horn cavity within the intake valve of a combustion chamber has a valuable acoustical wave attenuative property even when used in connection with a conventional combustion chamber, and in some cases may serve in and of itself as sufficient wave attenuative device to repress or avoid the worst effects of detonation. Here again the horn-shaped slender passage must be a proper acoustic structure as set out hereinabove, and must not be confused with the well known "tulip" intake valve shape with its shallow depression.

Figure 2 shows a combustion chamber extension 18a which may be substituted for the combustion chamber extension 18 of the embodiment of Figure 1, and is accordingly to be considered in combination with the engine of Figure 1. This chamber extension 18a has features similar to the chamber 18 of Figure 1, but its uniform diameter bore 47a which joins with the exponential throat of the horn-shaped combustion chamber is of substantially increased diameter, and the whole extension device 18a accordingly becomes of substantially reduced length. The bore 47a of Figure 2 is not left open, as in the form of Figure 1, but is instead packed with a body 48 of some suitable sound wave absorptive material having fine passageways into and through which the sound waves are forced to travel and wherein the waves are readily and effectively attenuated and absorbed. A cross pin 49 may be used to position the body 48. As typical examples, but without intention of limiting the invention, the body 48 may be Pyrex fibre glass, or tungsten wool, such substances being able to withstand the high combustion temperature present, but having the necessary sound wave absorptive properties.

Figure 3 shows a modification of the poppet valve shown in Figure 1, the valve 14a having an exponential horn-shaped chamber 50a, into whose throat portion is packed sound wave absorptive or attenuative material of the same nature mentioned in connection with Figure 2. Thus a body 55 of some such material as fibre glass or tungsten wool may be packed into the throat of the chamber 50a, and held by a cross pin 56, and will have sound wave attenuative characteristics sufficient to make unnecessary the provision of the fine bore 52 described in connection with the valve of Figure 1.

In Figure 4 I have shown a modified internal combustion engine consisting of water-cooled block 60 formed with cylinder 61 containing piston 62, and this block 60 is furnished with water-cooled head 63 which encloses a combustion chamber space 64. Suitable intake and exhaust passages may be provided, controlled by suitable poppet valves, as suggested in the drawings, though these provisions may be entirely conventional and a detailed description thereof will not be necessary.

The top of head 63 is provided with one or more threaded ports, such as indicated at 66 and 67, and screwed into these ports are the externally threaded tubular extensions 68 and 69 of auxiliary wave attenuation chamber devices 70 and 71, respectively.

Considering first the chamber 70, this chamber comprises a cylindrical housing 72 projecting upwardly from the threaded member 68, and receiving through its open upper end a body 73 whose longitudinal curvature is exponential in form, so as to provide between the exterior side-wall of said body 73 and the interior of housing 72 a chamber 74 whose annular cross-sectional area diminishes in an upward direction according to an exponential function. In other words, the exponential chamber space 74 is the equivalent of the space inside an exponential horn, and the exponential chamber space 74 will accordingly function acoustically just as will the horn shaped chamber previously described. Preferably, the body 73 is formed on an exponential curve up to a plane 76, where the clearance passage 77 between the body 73 and the wall 72 is of the order of anything from a few thousandths of an inch to a millimeter or thereabouts. The clearance passage extends with this dimension from the plane 76 to the point where the body 73 has a screw-threaded section 78 screwed into the internally screw-threaded portion 79 at the upper end of casing 72.

The operation of the sound wave attenuative means 70 will be understood without further description, since the functions are the same as with the horn types previously discussed. Suffice it to say that detonation generated acoustic waves entering the mouth of the chamber 70 will experience very great increase in energy density in moving up the exponential chamber passage 74, and the acoustic wave energy will then be largely dissipated and absorbed within the narrow clearance passage 77 above the plane 76.

As an optional feature, the body 73 is shown as formed with a longitudinal bore 82 extending from its upper end to an annular seat 83, and extending downwardly through annular seat 83 is an internally threaded socket 84 for the housing 85 of a spark plug 86, the downwardly projecting insulator portion 87 of which is tightly received within an aperture opening through the lower end of the body 73. The electrode tip 90 of the spark plug is spaced from a grounded electrode rod 91 projecting from the side of housing 70. Thus the one auxiliary device 70 combines a detonation wave attenuating means and a mounting for a spark plug.

The wave attenuative device 71 mentioned previously is formed with an exponential horn-shaped chamber or wave guide 100 whose throat portion continues to a small diameter of a millimeter or less, and finally terminates in an orifice open to atmosphere, as indicated at 101. The mouth or bell of the horn-shaped chamber 100 is of somewhat larger diameter than the threaded opening 67, and the opening from the chamber 100 into the combustion chamber 64 of the engine is defined by a somewhat constricting wall portion 102. Thus the mouth of the horn is made of greater diameter than the port in the top of the engine head. In this way the maximum area of acoustical wave front received from the combustion chamber is increased, the intervening constriction being of little consequence since it is short relative to a wave length of the acoustical waves to be attenuated. I thus gain the benefit of a larger horn than would otherwise be permitted by the size of the port through the head of the engine.

The opening of the throat of the exponential chamber 100 through the end of the device 71 results in dissipation of acoustical wave energy, and is thus one form of acoustical wave attenuator means which may be employed at the terminal portion of the exponential horn. The orifice 101 and the passageway communicating therewith are of sufficiently fine bore that no substantial loss of engine compression will result, but much acoustical wave energy will be dissipated therethrough. Actually the small volume high velocity outflow tends to help attenuation of sound waves travelling down the passage. It will be obvious that the extension of the throat of the exponential horn shaped cavity through the end of the device so as to open to atmosphere is a feature that may be employed with any of the embodiments of the invention, as for instance the embodiment of Figure 1; and it is to be understood that the bore 47 of Figure 1 may accordingly be continued through the end of the combustion chamber extension device 18 if so desired.

Figure 5 shows a further auxiliary wave attenuative device 110, having threaded tubular portion 111 adapted to engage in a threaded engine port, as for one of the ports 66 or 67 of Figure 4. This device 110 contains an exponential horn-shaped chamber 112 opening through the portion 111 thereto, and therefore into the combustion chamber of an engine into which the device is inserted. The fine throat portion 113 of this horn-shaped chamber 112 opens into an enlarged surge chamber 114, which, in the operation of the engine, accepts and receives a substantial flow of combustion gases through the passage 113 from each engine explosion. Following the engine explosion the gases compressed into this surge chamber 114 of course return to the combustion chamber. This flow cycle at engine frequency (much lower than the sonic frequency) is of large amplitude and tends to keep the attenuative passage 113 cleaned and open. This surge type of flow into and then from the chamber 114 occurs at supersonic velocity, because of the high magnitude of ordinary explosion pressures, and its effect is believed to aid in the attenuation of the superimposed detonation waves.

Figure 6 shows an attenuation device, which is in general respects like the device 70 of Figure 4, but of lesser expansion ratio to respond to longer wave lengths, and without provision for mounting a spark plug therein. The device consists of cylindrical housing 121, threaded at its lower end 122 for mounting it in a port in the engine opening into a combustion chamber thereof. The housing 121 is conical at its upper end, as at section 124, and its upper extremity has a mounting flange 125. Exponential shaped body 126 protrudes downwardly in housing 121, its upper end portion 127 also being conical, and having at the top mounting flange 128. A gasket 129 determines the clearance passage 130 between the conical portions of the housing and body, and may be adjusted in thickness to find the best operating dimension. Screws 134 passing through the flanges 125 and 128 fasten the body in assembly with the housing 121. In this instance, the body 126 extends on an expanding exponential curve to the region of its conical portion 127, and the narrow clearance passage 130 is relied upon for final attenuation of the wave.

The invention has now been disclosed by illustration and description of various present illustrative embodiments thereof. It is of course to be undertsood that these are for example only, and that many modifications thereof will occur to those skilled in the acoustic and engine arts, and may be adopted within the broad scope of the present invention as defined in the appended claims.

I claim:

1. In an internal combustion engine, an internal combustion chamber having wall means communicating therewith defining a flared acoustic attenuator horn whose large end opens to the combustion chamber and whose throat opens to an attenuation space of large volume, said horn having frequency response for a characteristic acoustic pressure cycle pattern generated in said combustion chamber by detonation.

2. The subject matter of claim 1, wherein said attenuation space comprises an enclosed surge chamber connected to the small end of the horn.

3. The subject matter of claim 1, wherein said attenuation space comprises outside atmosphere.

4. In an internal combustion engine, an internal combustion chamber having wall means communicating therewith defining a flared acoustic attenuation horn whose large end opens to the combustion chamber and whose throat terminates in a small orifice discharging outside the combustion chamber, said horn having frequency response for a characteristic acoustic pressure cycle pattern generated in said combustion chamber by detonation.

5. In an internal combustion engine, an internal combustion chamber having wall means communicating therewith defining a flared acoustic attenuator horn whose large end opens to the combustion chamber and whose throat terminates in a small orifice discharging to atmosphere, said horn having frequency response for a characteristic acoustic pressure cycle pattern generated in said combustion chamber by detonation.

ALBERT G. BODINE, Jr.

References Cited in the file of this patent

UNITED STATES PATENTS

| Number | Name | Date |
|---|---|---|
| 2,118,058 | Riley | May 24, 1938 |
| 2,293,181 | Terman | Aug. 18, 1942 |

FOREIGN PATENTS

| Number | Country | Date |
|---|---|---|
| 206,238 | Great Britain | Nov. 2, 1923 |